United States Patent
Werner

(10) Patent No.: US 7,519,131 B2
(45) Date of Patent: Apr. 14, 2009

(54) METHOD AND DIGITAL CIRCUIT FOR TRANSMITTING A PLURALITY OF BIT SEQUENCES TO BE TRANSMITTED VIA SEVERAL BUS LINES

(75) Inventor: Christoph Werner, Grafing (DE)

(73) Assignee: Infineon Technologies AG (DE)

( * ) Notice: Subject to any disclaimer, the term of this patent is extended or adjusted under 35 U.S.C. 154(b) by 634 days.

(21) Appl. No.: 10/312,093

(22) PCT Filed: Jul. 6, 2001

(86) PCT No.: PCT/DE01/02502

§ 371 (c)(1),
(2), (4) Date: Mar. 18, 2003

(87) PCT Pub. No.: WO02/03638

PCT Pub. Date: Jan. 10, 2002

(65) Prior Publication Data

US 2004/0037367 A1 Feb. 26, 2004

(30) Foreign Application Priority Data

Jul. 6, 2000 (DE) ................................. 100 32 932

(51) Int. Cl.
*H04L 27/00* (2006.01)
(52) U.S. Cl. .................................... 375/295
(58) Field of Classification Search .............. 375/295
See application file for complete search history.

(56) References Cited

U.S. PATENT DOCUMENTS 4,791,653 A * 12/1988 McFarland et al. .......... 375/367
5,598,406 A * 1/1997 Albrecht et al. ............. 370/296
5,953,377 A * 9/1999 Yoshida ...................... 375/295
6,507,620 B1 * 1/2003 Usui .......................... 375/257
6,546,025 B1 * 4/2003 Dupuy ........................ 370/509

FOREIGN PATENT DOCUMENTS

| DE | 4142652 A1 | 7/1993 |
| JP | 05334206 | 12/1993 |
| JP | 10-307558 | 11/1998 |

OTHER PUBLICATIONS

K. Steinbuch, Taschenbuch der Nachrichten-Verarbeitung, Springer-Verlag, Berlin 1962, p. 64-97.
A.B. Kahng, et al., Interconnect Tuning Strategies for High-Performance ICs, Proceedings of Design, Automation and Testing in Europe, Paris, Feb. 1998.
Cadence Datasheet, Envisia TM place-and-route with signal and design integrity, May 22, 2000.

(Continued)

*Primary Examiner*—Kevin M Burd
(74) *Attorney, Agent, or Firm*—Altera Law Group, LLC

(57) ABSTRACT

A pre-determined first bit sequence combination of a plurality of bit sequences to be transmitted is transformed into a second bit sequence combination. The second bit sequence combination has a reduced bit error probability compared to the first bit sequence combination. A transformation bit is stored during each transformation, indicating that the second bit sequence combination represents a transformed first bit sequence combination.

9 Claims, 1 Drawing Sheet

OTHER PUBLICATIONS

T. Grams, Kodierungsverfahren, BI Hochschul-Taschenbücher, 625, pp. 64-75, 1986.

M. Cuviello, et al., Fault Modeling and Simulation for Crosstalk in System-on-Chip Interconnects, Proceedings of the International Conference on Computer Aided Design (ICCAD), Nov. 1999.

X. Bai, et al., Self-Test Methodolgoy for At-Speed Test of Crosstalk in Chip Interconnects, Proceeding of the Design Automtion Conference (DAC), Jun. 2000.

ZP-000761080, Carter R O, Low-Disparity Binary Coding System, Electronics Letters, IEE Stevenage, GB, vol. 1, No. 3, May 1965, pts. 67-68.

* cited by examiner

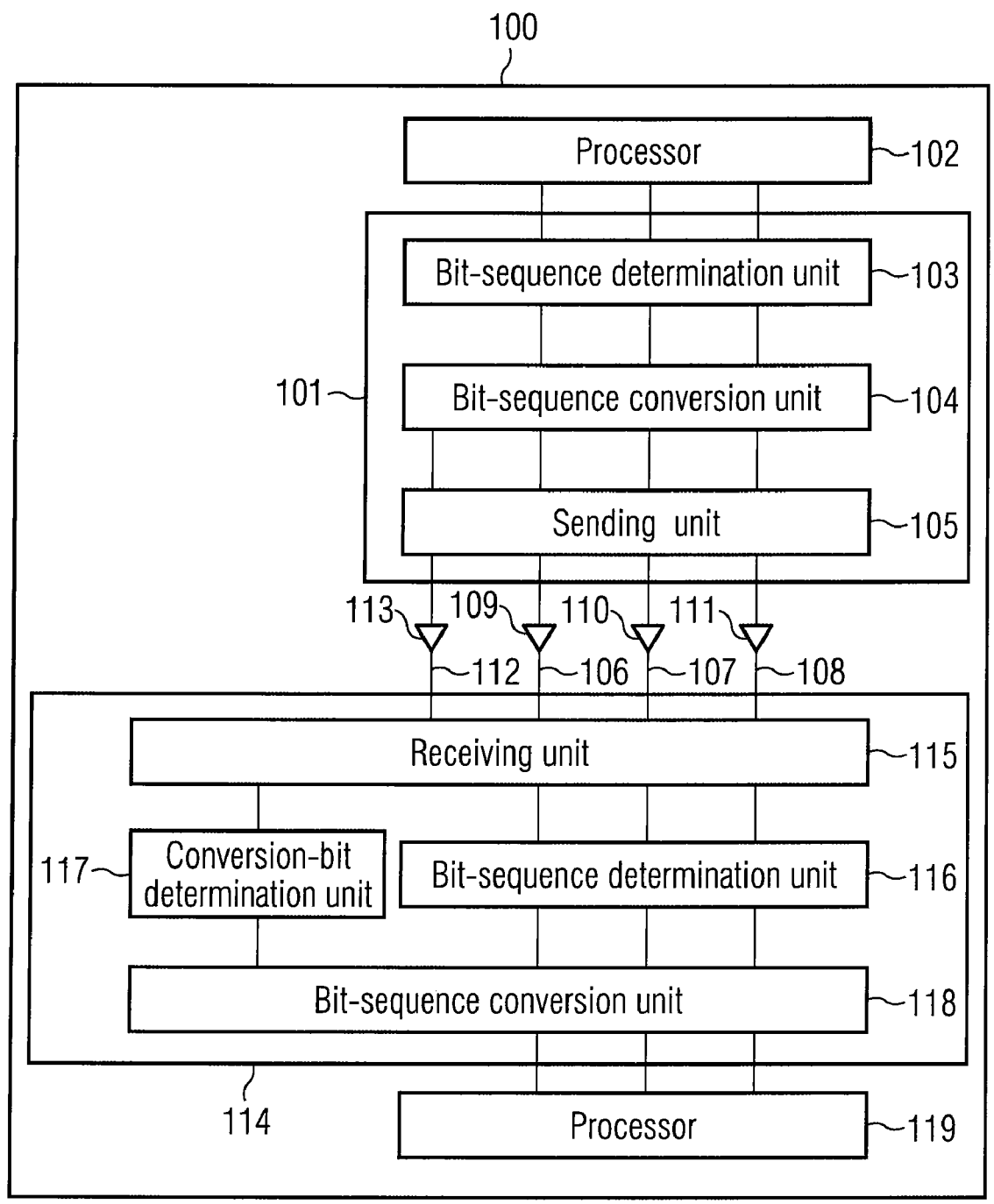

METHOD AND DIGITAL CIRCUIT FOR TRANSMITTING A PLURALITY OF BIT SEQUENCES TO BE TRANSMITTED VIA SEVERAL BUS LINES

The invention relates to a method and a digital circuit arrangement for transmitting a multiplicity of bit sequences to be transmitted via a plurality of bus lines, and to a method and a digital circuit arrangement for processing a multiplicity of bit sequences received via a plurality of bus lines.

Such methods and such digital circuit arrangements are disclosed in [1].

So-called crosstalk from electric signals between adjacent interconnects, i.e. lines, represents a significant problem, particularly in digital logic circuits in which the individual electric lines are arranged less than 0.25 µm apart.

For example, in the case of bus lines with an extended length varying from several millimeters to centimeters, the so-called coupling capacitances between the individual interconnects, i.e. the individual lines linking together the various logic blocks (i.e. circuit components within a computer system or in a computer chip), result in interference signals on the adjacent lines if the frequency of the signals to be transmitted is in the range of approximately 1 GHz or higher.

These interference signals can result in transmission errors in the electric signals to be transmitted, which signals represent bit sequences to be transmitted. This leads to incorrect decoding of the bit sequences at the receiver, i.e. to incorrect specification of the bit sequences which were sent originally.

In order to reduce the crosstalk from the electric signals, [1] discloses the use of so-called repeater components after a relatively short line length to refresh the amplitude of the electric signals which represent the bit sequences to be transmitted.

Furthermore, [2] discloses the provision of additional lines between the individual data lines, which data lines are also referred to as active bus lines and carry the bit sequences to be transmitted in the form of electric signals. The additional lines are intended to electrically screen the electric signals between the active lines.

The provision of both repeater components and additional screening lines increases the demand for space in a digital circuit arrangement, and the chip surface required in such a digital logic circuit is therefore enlarged considerably.

Furthermore, [3] discloses the use of so-called error-detection codes and additional parity check bits to detect and sometimes even to correct individual incorrect electric signals. However, this procedure requires a relatively high level of redundancy in the data to be transmitted, resulting in a significant reduction in the useful data rate that can be achieved when transmitting the bit sequences to be transmitted.

In particular, the application described above in digital logic circuits where crosstalk from signals between adjacent bus lines can be observed and incorrect signals have been identified does not allow correction of the errors that have occurred and have been identified by repeating the transmission operation for the bit sequence to be transmitted, because crosstalk from the electric signals is not a statistically determined activity, but would occur again in the same way during the second transmission.

It is also disclosed in [4] that the level of crosstalk is dependent on different factors.

Therefore, as described in [4], the strength of the driver signal, the length of the individual lines, the clock rate, i.e. the transmission rate of the individual electric signals, the impedance matching and other parameters have a significant influence on the actual level of crosstalk occurring between two or more electric lines.

Furthermore, a method for determining bit sequence combinations with increased bit-error probability, i.e. bit-sequence combinations with greater susceptibility to interference, is disclosed in [5].

[6] contains fundamentals of coding principles and the representation of codes.

[7] describes a method for converting data words, among which data words are selected from the 16 384 possible data-word combinations of 14-bit data words in which at least 2 consecutive bits are the same, not more than 8 consecutive bits are the same, and not more than 4 consecutive bits are the same at the beginning and end of a data word.

Of the 266 14-bit data words according to this specification, 256 data words are selected and are assigned to the 256 possible data words of an 8-bit data signal, where this assignment can be specified as desired.

The problem addressed by the invention is that of transmitting a multiplicity of bit sequences to be transmitted via a plurality of bus lines in such a way that the overall probability of error, i.e. in general terms the probability of error due to the occurrence of crosstalk from electric signals between the lines, is lower in comparison with the method disclosed in [1].

The problem is solved by the methods and the digital circuit arrangements with the features as claimed in the independent patent claims.

In a method for transmitting a bit sequence to be transmitted via a plurality of bus lines, a first step provides for determining a predefined first bit-sequence combination in the multiplicity of bit sequences to be transmitted. The first bit-sequence combination is characterized by an increased bit-error probability when it is transmitted.

For example, as disclosed in [5], in the case of three electric lines which are very closely adjacent, i.e. laid in close proximity to each other, for example electric lines which are arranged approximately 0.25 µm apart, it is possible for crosstalk from the applied electric signals to occur on the lines concerned.

It has been observed, for example, that if the bit sequence with the logic values "010" is applied to the three bus lines at a first instant, i.e. a bit sequence is applied to the three lines, a level of 0 V being applied to each of the outer lines and a high level, i.e. an electric voltage of approximately 2.5 V for example, being applied to the middle line, an increased probability of the occurrence of crosstalk is observed if the bit sequence "101" is applied to the lines in the immediately subsequent time step, which subsequent time step is specified by a clock unit (not shown) that clocks the electric lines, i.e. the transmission behavior.

In other words, this means that in the immediately subsequent time step, a high level, i.e. an electric voltage with a value not equal to zero, is applied to each of the outer bit lines and then no electric voltage is applied to the middle line.

As a result of the crosstalk, i.e. in particular as a result of the coupling capacitances between the lines, the transitional state means that the middle line nonetheless exhibits an electric signal level which is not equal to zero, said electric signal level being generated by the high level of the electric signal on the outer lines.

There is a non-negligible probability that the electric signal level will be interpreted as a high level at the receiver end, said high level describing a bit value of logic "1", and will therefore be decoded accordingly. This is the case if the signal level of the electric signal on the middle line exceeds a predefined threshold value at the receiver.

Such combinations of bit sequences, i.e. two bit sequences and the associated state transitions between the two bit sequences at two different, immediately successive instants, is able to be determined using information theory or empirically, by applying different bit patterns, i.e. bit sequences, to the inputs of an electric circuit regarded as a so-called "black box", and determining in a multiplicity of iterations, in which the individual bit sequences are repeatedly applied to the inputs, whether or not the transmission behavior of the respective bit sequences or transitions between the bit sequences is susceptible to interference.

By forming histograms, i.e. by simply counting incorrect transmissions and the corresponding assignments of the incorrect transmissions to the state transitions between bit sequences which have been applied to the inputs of the electric circuit, it is possible to determine bit-sequence combinations that are susceptible to interference, i.e. first bit-sequence combinations with increased bit-error probability.

These first bit-sequence combinations which are characterized by increased bit-error probability are stored, in a table for example, in the memory of an encoding device.

Furthermore, the methods described above can also be used to determine which bit-sequence combinations are robust in terms of susceptibility to interference, i.e. which bit-sequence combinations result in a decreased bit-error probability.

The method described above thus also determines a plurality of second bit-sequence combinations which exhibit, in comparison with the previously determined first bit-sequence combinations, a lower bit-error probability when they are transmitted. The first bit-sequence combinations and corresponding second bit-sequence combinations, which can be derived from a given first bit-sequence combination by changing one bit in each case, for example, are stored in a mapping table.

A table is therefore stored in the form of a mapping table which respectively specifies a first bit-sequence combination with increased bit-error probability and a second bit-sequence combination with lower bit-error probability which is associated with said first bit-sequence combination.

According to the method, if at least one predefined first bit-sequence combination has been determined in the multiplicity of bit sequences to be transmitted, then the first bit-sequence combination is converted into the corresponding associated second bit-sequence combination with lower bit-error probability, preferably on the basis of the stored table.

A conversion bit is stored each time a first bit-sequence combination is converted into a second bit-sequence combination.

Alternatively, there is provision for generating and storing a conversion bit for each bit-sequence combination, such that in the event of a first bit-sequence combination being converted into a second bit-sequence combination the conversion bit is stored with a first value, and in the event that there is no conversion of the bit-sequence combination the conversion bit is assigned a second binary value.

In a final method step, the multiplicity of bit sequences to be transmitted is transmitted, together with the now respectively mapped, i.e. converted, second bit-sequence combination and the generated conversion bits.

According to one configuration of the invention, it is possible during transmission to apply one bit in each case to each electric line, for example a bus line, at any transmission instant as specified by a clock unit, for example. The first bit-sequence combination and the second bit-sequence combination are respectively formed by temporally successive bits, said bits needing to be applied to the electric lines, i.e. preferably the bus lines, at successive transmission instants.

According to one configuration of the invention, there is also provision for the conversion bits to be transmitted via a further bus line.

Alternatively, the conversion bits can also be temporally staggered in relation to the associated second bit-sequence combination during transmission via the lines, for example a predefined number of conversion bits can be transmitted via the lines as an individual conversion-bit vector after a correspondingly predefined number of transmitted bit-sequence combinations, for example after a predefined number of clock cycles. In an exemplary embodiment with three bus lines, generally with n bus lines, a conversion-bit vector with n conversion bits is applied to the electric lines after n clock cycles, i.e. after the transmission of n bit sequences.

Alternatively of course, it is also possible to transmit the conversion bits in a different order, as long as it is possible for the receiver to assign the conversion bits to the respective bit sequences.

A bit sequence in the context of a plurality of bit lines being used is understood to mean a number of electric signals in each case, each signal representing one bit, which electric signals are applied to the electric lines at a clock instant, i.e. at a transmission instant.

As described above, the first bit-sequence combinations with increased bit-error probability can be determined at the beginning of the method, for example empirically using a transmission system or a model of a transmission system having essentially the same transmission properties as the bus lines.

The transmission system itself, which can be used to determine the relevant first bit-sequence combinations in a training phase, can also be used to determine a first bit-sequence combination.

In a method for processing a multiplicity of received bit sequences via a plurality of bus lines, after receipt of the multiplicity of corresponding bit sequences or even during receipt of the multiplicity of corresponding bit sequences, at least one predefined second bit-sequence combination is determined in the multiplicity of received bit sequences. The second bit-sequence combination is characterized, in comparison with a first bit-sequence combination, by a lower bit-error probability.

In each case, it is determined whether an associated conversion bit is present for the second bit-sequence combination, said conversion bit indicating that the determined second bit-sequence combination represents a converted first bit-sequence combination.

Alternatively, for each determined bit-sequence combination at each transmission instant, i.e. at each receiving instant at the receiving end, provision is made to analyze, i.e. evaluate, a conversion bit which is also received in each case, and to determine according to the conversion bit whether or not the received bit-sequence combination has been converted at the sending end.

If receipt of the conversion bits is temporally staggered, then it is necessary to temporarily store at least the associated second bit-sequence combinations, and only after receipt of all the corresponding conversion bits and associated second bit-sequence combinations to analyze the conversion bits, and if necessary in a subsequent step to convert the second bit-sequence combinations back into the associated first bit-sequence combinations into the in accordance with the mapping table which is likewise stored at the receiving end.

A digital circuit arrangement for transmitting a multiplicity of bit sequences to be transmitted via a plurality of bus lines has a bit-sequence determination unit for determining at least one predefined first bit-sequence combination in the multiplicity of bit sequences to be transmitted. The digital circuit arrangement additionally features a bit-sequence conversion unit for converting the determined first bit-sequence combinations into a second bit-sequence combination, preferably in accordance with a predefined mapping table. The bit-sequence conversion unit generates a conversion bit for every conversion at least, said conversion bit indicating that the second bit-sequence combination represents a converted first bit-sequence combination. Furthermore, a transmission unit is provided for transmitting the multiplicity of bit sequences to be transmitted, with the second bit-sequence combination and the conversion bits.

The digital circuit arrangement can include a plurality or multiplicity of bit lines, which are connected to the transmission unit, for transmitting the multiplicity of bit sequences to be transmitted.

A digital circuit arrangement for processing a multiplicity of received bit sequences via a plurality of bus lines has a receiving unit for receiving the transmitted bit sequence, and a bit-sequence determination unit for determining at least one predefined second bit-sequence combination in the multiplicity of received bit sequences.

A conversion-bit determination unit is likewise provided, in which it is determined whether an associated conversion bit is present for the second bit-sequence combination, said conversion bit indicating that the determined second bit-sequence combination represents a converted first bit-sequence combination.

A bit-sequence conversion unit is also provided for converting a determined second bit-sequence combination into the first bit-sequence combination.

An exemplary embodiment of the invention is shown in the FIGURE and explained in more detail below.

BRIEF DESCRIPTION OF DRAWINGS

FIG. 1 illustrates a block diagram of an encoding device in accordance with an exemplary embodiment of the invention.

DETAILED DESCRIPTION OF THE DRAWING

FIG. 1 shows a digital circuit arrangement on a computer chip 100, having an encoding device 101 and a decoding device 114 which are electrically connected together by means of a computer bus with a data-word bus width of 3 bits, i.e. with three electric lines 106, 107 and 108.

In accordance with the exemplary embodiment, the bus line has a length of 1000 μm and has three data lines 106, 107 and 108 in accordance with a 0.25-μm technology metallization layer M3. The interconnect geometry is specified as having an interconnect height of 0.45 μm, a distance between interconnects of 1.0 μm and an interconnect width of 1.2 μm. The dielectric used in the exemplary embodiment is silicon dioxide.

The capacitances resulting from this arrangement are 75 fF for the coupling capacitance C(coupling) and 40 fF for the ground capacitance C(ground).

A bus line 112 is also provided for transmission of conversion bits as described below, said bus line being connected between the encoding device 101 and the decoding device 114.

The encoding device 101 includes a processor 102. The encoding device 101 also includes a bit-sequence determination unit 103 connected to the processor 102, which bit-sequence determination unit utilizes a mapping table that is stored in a memory (not shown) to determine first bit sequences, which are predefined and stored in said mapping table and have increased bit-error probability when they are transmitted via the bus lines 106, 107 and 108, from a bit sequence to be transmitted, said bit sequence having been supplied to the bit-sequence determination unit 103 by the processor 102.

At each transmission instant, the multiplicity of temporally successive bit sequences includes a bit sequence in which the number of bits to be transmitted corresponds to the number of data lines present in the computer bus concerned, and therefore in this exemplary embodiment with three data lines 106, 107 and 108 the bit sequences each have three bits. Each bit sequence, having a data-word length of three bits in accordance with the exemplary embodiment, is transmitted in a respective clock cycle that is specified by a clock generator (not shown). One bit sequence per time step is applied to the data lines of the computer bus 106, 107 and 108 and is transmitted to the decoding device 114, i.e. supplied to said decoding device, by means of driver circuits 109, 110 and 111 connected to the data lines 106, 107 and 108, using the relevant electric voltage level that represents the value of the corresponding bit.

The table below shows a first bit-sequence combination in each case, with two respective bit sequences at two successive transmission instants $t_{n-1}$ and $t_n$, for which instants an increased bit-error probability can be observed due to the state transition of the signals applied at instant $t_{n-1}$ and at instant $t_n$.

| First bit-sequence combination | | Second bit-sequence combination | |
|---|---|---|---|
| $t_{n-1}$ | $t_n$ | $t_{n-1}$ | $t_n$ |
| "...010..." | "...101..." | "...010..." | "...100..." |
| "...000..." | "...101..." | "...000..." | "...100..." |
| "...000..." | "...111..." | "...000..." | "...110..." |
| "...101..." | "...010..." | "...101..." | "...011..." |
| "...111..." | "...010..." | "...111..." | "...011..." |
| "...111..." | "...000..." | "...111..." | "...001..." |

The bit with the binary value "0" or "1" shown in the left-hand column in each case corresponds to the corresponding electric signal applied to the first bit line 106. The bit value given in the middle column of the bit sequence listed in the table in each case describes the electric signal level applied to the second bit line 107. The bit value shown in the right-hand column in the bit sequence corresponds to the signal level applied to the third bit line 108.

If a first bit-sequence combination in accordance with the above table is supplied to the bit-sequence determination unit 103, then this is determined by the bit-sequence determination unit 103 and a corresponding second bit-sequence combination is formed using the table shown, said second bit-sequence combination respectively being taken from the same row of the table as the corresponding first bit-sequence combination and having a lower bit-error probability in comparison with the first bit-sequence combination.

For example, given a first bit-sequence combination in which a bit sequence of "010" changes to "101", the second part "101" of the first bit-sequence combination is replaced by a corresponding second part of the second bit-sequence combination having the logic bit values "100", which then has a lower bit-error probability than the second part "101" of the first bit-sequence combination.

This is because the third bit, having the logic value 1 according to the second part of the first bit-sequence combination, is not set to a high level according to the second part of the second bit sequence, and therefore the signal level of the middle data line is not increased by the existent coupling capacitances to the extent that the relevant threshold is statistically exceeded in the context of decoding, and therefore a logic value "0" is also correctly decoded when receiving the electric signals for the middle data line.

Similarly, the correspondingly for the first bit-sequence combinations shown in the other rows of the above tables are also replaced by the appropriate corresponding second bit-sequence combinations.

No mapping of the bit-sequence combinations to be transmitted is performed in respect of any further, non-critical bit-sequence combinations, a few examples of which are shown in the table below.

In accordance with this exemplary embodiment, a conversion bit with a first binary value is generated in each case, having a logic value of "1" in accordance with the exemplary embodiment, by a bit-sequence conversion unit 104, in which additionally the first bit-sequence combination is mapped onto the second bit-sequence combination. A conversion bit with the logic value "0" is generated for each bit-sequence combination which is not converted.

The conversion bits are supplied to a sending unit 105 in the same way as the bit sequence with the second bit-sequence combination, and the conversion bits are transmitted by the sending unit to the decoding device 114, in particular a receiving unit 115, via a conversion-bit bus line 112 with a corresponding interposed driver circuit 113.

Furthermore, the bit sequences to be transmitted are supplied to the receiving unit 115 via the data lines 106, 107 and 108.

The received conversion bits are supplied to a conversion-bit determination unit 117 for determining, in respect of the second bit-sequence combination, which second bit-sequence combination is supplied in each case by the receiving unit 115 to a bit-sequence determination unit 116, and it is determined whether an associated conversion bit having the logic value "1" has been received for this received bit-sequence combination in each case.

If this is the case, then inverse mapping is carried out from the second bit-sequence combination to the associated first bit-sequence combination in accordance with the mapping table which is also stored in the decoding device 114.

However, if the conversion bit associated with a corresponding second bit sequence is detected to have a value of "0", then no mapping of the received second bit-sequence combination is carried out.

The bits which have been processed in this way and converted in the bit-sequence conversion unit 118 are supplied to a processor 119, said processor being connected to the bit-sequence conversion unit, for further processing.

The following publications are cited in this document:

[1] A. B. Kahng et al., Interconnect Tuning Strategies for High-Performance ICs, Proceedings of Design, Automation and Testing in Europe, Paris, February 1998;
[2] Cadence Datasheet, Envisia™ place-and-route with signal and design integrity, available over the Internet on May 22, 2000 from the following address: http://4.18.241.156/company/pr/archive99/si.pdf
[3] T. Grams, "Kodierungsverfahren" [Encoding methods], BI Hochschul-Taschenbücher, 625, pages 64-75, 1986;
[4] M. Cuviello et al., Fault Modeling and Simulation for Crosstalk in System-on-Chip Interconnects, Proceedings of the International Conference on Computer-Aided Design (ICCAD), November 1999, available over the Internet on May 8, 2000 from the following address: http://aspire.ucsd.edu/projects/dsm/publication.html
[5] X. Bai et al., Self-Test Methodology for At-Speed Test of Crosstalk in Chip Interconnects, Proceeding of the Design Automation Conference (DAC), June 2000, available over the Internet on May 8, 2000 from the following address: http://aspire.ucsd.edu/projects/dsm/publication.html
[6] K. Steinbuch, Taschenbuch der Nachrichtenverarbeitung [Information processing booklet] Springer Verlag, pages 64-97, 1962
[7] DE 41 42 652 A1

LIST OF REFERENCE NUMERALS

Computer chip

Encoding device

Processor

Bit-sequence determination unit

Bit-sequence conversion unit

Sending unit

First data line

Second data line

Third data line

First driver circuit

Second driver circuit

Third driver circuit

Conversion-bit line

Conversion-bit driver circuit

Decoding device

Receiving unit

Bit-sequence determination unit

Conversion-bit determination unit

Bit-sequence conversion unit

Processor

The invention claimed is:

1. A method for transmitting a multiplicity of bit sequences to be transmitted via a plurality of lines in which the bits of each bit-sequence are distributed across the plurality of lines and transmitted at the same instant, the method comprising:
   determining at least one first bit-sequence combination with an increased bit-error probability when transmitted due to crosstalk between the lines across which the bit-sequence is distributed from the multiplicity of bit sequences to be transmitted;
   converting, by using a mapping table, the first bit sequence combination into a second bit-sequence combination with a lower bit error probability;
   generation of a separate conversion bit for each second bit-sequence combination that indicates that the second bit-sequence combination represents the converted first bit-sequence combination; and
   transmitting the multiplicity of bit sequences having a second bit-sequence combination instead of the corresponding first bit-sequence combination, wherein the bits of the second bit-sequence combination are distributed across the plurality of lines and transmitted at the same instant and transmitting each associated conversion bit.

2. The method as claimed in claim 1, further comprising:
applying one bit to each line at each transmission instant during transmission; and
forming the first bit-sequence combination and the second bit sequence combination by temporally successive bits, which are to be applied to the lines at successive transmission instants.

3. The method as claimed in claim 1, in which the conversion bits are transmitted via a separate line dedicated to conversion bits.

4. The method as claimed in claim 1, in which the conversion bits are temporally staggered in relation to the associated second bit sequence during transmission via the lines.

5. The method as claimed in one of claims 1 to 4, in which the multiplicity of bit sequences with the second bit-sequence combination and the conversion bits are received via a plurality of lines and are processed in accordance with the following steps:
  determining at least the second bit-sequence combination in the multiplicity of received bit sequences;
  determining whether an associated conversion bit is present for the second bit-sequence combination, said conversion bit indicating that the determined second bit-sequence combination represents a converted first bit-sequence combination; and
  converting the second bit-sequence combination into the first bit-sequence combination.

6. The method as claimed in claim 1, wherein the method step of determining the at least one first bit-sequence combination with an increased bit-error probability when transmitted, is performed using a histogram.

7. A digital circuit arrangement for transmitting a multiplicity of bit sequences to be transmitted via a plurality of lines in which the bits of each bit-sequence are distributed across the plurality of lines and transmitted at the same instant, the arrangement comprising:
  a bit-sequence determination unit for determining a first bit-sequence combination, having an increased bit-error probability when it is transmitted due to crosstalk between the lines across which the bit-sequence is distributed;
  a bit-sequence conversion unit for converting the first bit-sequence combination into a second bit-sequence combination having lower bit-error probability using a mapping table and generating a separate conversion bit for every conversion, said conversion bit indicating that the associated second bit-sequence combination represents a converted first bit-sequence combination; and
  a transmission unit for transmitting the bit-sequence combination, having the second bit-sequence combination instead of the corresponding first bit-sequence combination, wherein the bits of the second bit-sequence combination are distributed across the plurality of lines and transmitted at the same instant and transmitting the associated conversion bit.

8. The digital circuit arrangement as claimed in claim 7, further comprising:
  a plurality of bit lines which are connected to the transmission unit for transmitting the bit sequence to be transmitted.

9. A digital circuit arrangement for processing a multiplicity of received bit sequences via a plurality of lines in which the bits of each bit-sequence are distributed across the plurality of lines and transmitted at the same instant, further comprising:
  a bit-sequence determination unit for determining at least one second bit-sequence combination in the multiplicity of received bit sequences using a mapping table in which at least one first bit-sequence combination, having increased bit-error probability when it is transmitted across the plurality of lines due to crosstalk between the lines has the second bit-sequence combination having lower bit-error probability associated with it when it is transmitted across the plurality of lines;
  a conversion-bit determination unit for determining whether an associated separate conversion bit is present for every second bit-sequence combination which is determined, said conversion bit indicating that the determined second bit-sequence combination represents a converted first bit-sequence combination; and
  a bit-sequence conversion unit for converting a determined second bit-sequence combination into the first bit-sequence combination.

* * * * *